US005561273A

United States Patent [19]
Yamanashi

[11] Patent Number: 5,561,273
[45] Date of Patent: Oct. 1, 1996

[54] ELECTRICAL CABLE HOLDING CASE

[75] Inventor: Makoto Yamanashi, Shizuoka, Japan

[73] Assignee: Yazaki Corporation, Tokyo, Japan

[21] Appl. No.: 337,533

[22] Filed: Nov. 9, 1994

[30] Foreign Application Priority Data

Nov. 11, 1993 [JP] Japan ............................ 5-282268

[51] Int. Cl.⁶ .................................................. H02G 3/22
[52] U.S. Cl. ........................ 174/152 R; 174/22 R;
174/65 R; 174/76; 174/77 R; 174/151;
174/153 R; 439/936
[58] Field of Search .......................... 174/151, 65 R,
174/77 R, 76, 153 G, 152 R, 153 R, 65 SS,
22 R, 152 G; 439/204, 521, 936

[56] References Cited

U.S. PATENT DOCUMENTS

| 2,206,489 | 7/1940 | Schedel | 174/152 GM X |
| 4,041,241 | 8/1977 | Olmstead et al. | 174/153 G |
| 4,313,030 | 1/1982 | Bosch | 174/151 |
| 4,454,381 | 6/1984 | Ito et al. | 174/151 |
| 5,278,357 | 1/1994 | Yamanashi | 174/151 |
| 5,353,492 | 10/1994 | Potocnik et al. | 29/597 |

*Primary Examiner*—Kristine L. Kincaid
*Assistant Examiner*—Paramita Ghosh
*Attorney, Agent, or Firm*—Sughrue, Mion, Zinn, Macpeak & Seas

[57] ABSTRACT

An electrical cable holding case that can prevent a charged resin material for sealing from cracking by blocking the sharp bending of electrical cables when they are taken out of the case is provided. An electrical cable holding case includes a cylindrical case main body and a lid-like rear holder having electrical insertion holes and resin charging holes. Electrical cables taken out of the case main body via the electrical cable insertion hole of the rear holder are embedded by resin molding from the case main body to the outer surface of the rear holder to hold the electrical cables so as to be watertight. Electrical cable support walls are arranged at the edges of the electrical cable insertion holes outside the rear holder.

7 Claims, 5 Drawing Sheets

ELECTRICAL CABLE HOLDING CASE

BACKGROUND OF THE INVENTION

1. Field of the Invention

The invention relates to an electrical cable holding case that can prevent oil from leaking through electrical cables laid out within an oil cover such as a transmission.

2. Related Art

FIG. 6 is an exploded perspective view of a conventional electrical cable holding case that prevents oil leakage disclosed in Japanese Unexamined Patent Publication No. 4-261318; and FIG. 7 is a longitudinal sectional view of the electrical cable holding case as assembled.

In these figures, reference numeral 1 denotes a case main body made of synthetic resin; and 2, an oil cover such as a transmission (reference numeral 3 denotes the interior of the oil cover in FIG. 7). A flange portion 6 for an open hole 5 of the cover 2, an O ring 7, and a setting groove 8 are annularly arranged over the outer circumference of a cylindrical wall 4 of the case main body 1. A pair of flexible retaining pawls 9 are also provided, projecting in the axial direction.

There is arranged inside cylindrical wall 4 a compartment wall 11, having a plurality of electrical cable lead holes 10 disposed annularly therein. Also, a plurality of partitioned chambers 13 communicating with the electrical cable lead holes 10 are formed by arranging partition walls 12 upright in the radial direction from the center of the compartment wall 11. Each partitioned chamber 13 has an opening 14 facing the interior of the cover 2, and each opening 14 is continuous to an empty chamber 15 surrounded by a cylindrical wall 4a. Further, frame pieces 17 having retaining windows 16 are projected on an end of the cylindrical wall 4a. An empty chamber 18 surrounded by a cylindrical wall 4b that faces the outside of the cover 2 is continuous from the compartment wall 11. Radially extending ribs 19 are arranged between the adjacent electrical cable lead holes 10 on the outer surface of the compartment wall 11. In FIGS. 6 and 7, reference numerals 20 and 21 denote resin charging holes.

In FIGS. 6 and 7, reference numeral 22 denotes a rear holder made of synthetic resin and fitted into the empty chamber 15 of the case main body 1. A plurality of electrical cable insertion holes 24 corresponding to the partitioned chambers 13 of the case main body 1 and resin charging holes 25 are arranged on a circular bottom wall 23 of the rear holder 22. Retaining pieces 28 are disposed on an end of a circumferential wall 26 of the rear holder 22, the wall 26 being formed continuously from the bottom wall 23. Retaining pieces 28 have retaining projections 27 for the corresponding retaining windows 16 of the case main body 1.

Further, reference numeral 29 denotes a watertight rubber plug that is fitted into the other empty chamber 18 of the case main body 1. A plurality of small-diameter electrical cable attaching holes 30 corresponding to the electrical cable head holes 10 in the compartment wall 11 are arranged in the rubber plug 29. Reference numeral 31 denotes a blank plug made of synthetic resin. Blank plugs are inserted into the electrical cable attaching holes into which no electrical cable 32 is to be inserted.

An electrical cable 32 exits from the interior 3 of the cover 2. The electrical cable 32 is formed by unsheathing an intermediate sheath 33 of a single sheathed electrical cable and fixing a joint terminal 35 to the exposed conductor portion 34 by caulking. The joint terminal 35 is made of a metal plate and serves as a retaining member.

One end of the electrical cable 32 is inserted into the insertion hole 24 of the rear holder 22, and the other is inserted into the attaching hole 30 of the rubber plug 29 via the lead hole 10 from the partitioned chamber 13 of the case main body 1. The joint terminal 35, serving as a retaining member, is accommodated in the partitioned chamber 13 and held between the bottom wall 23 of the rear holder 22 and the compartment wall 11; that is, the rear holder 22 is fitted into and retained in the empty chamber 15. The rubber plug 29 is fitted into the other empty chamber 18 and forms a gap 36 with respect to the compartment wall 11, the gap 36 being equal to the height of the rib 19.

Furthermore, as shown in FIG. 7, a hardening flexible resin material 37 such as silicon resin is injected into the partitioned chambers 13 and the gap 36 from the resin charging holes 25 of the rear holder 22, thereby embedding both the conductor portion 34 and one sheathed end portion 33a of the electrical cable 32. Also, the resin material 37 is filled in the rear holder 22, thereby sealably holding the other sheathed end portion 33b. The hardening flexible resin material 37 exhibits satisfactory sealability while flexibly fitted with the conductor portion 34 under thermal expansion or contraction.

Since each electrical cable 32 in the interior of the oil cover is bent so as to be L-shaped as shown in FIG. 8 because of space restrictions within an automobile and this condition is persistently maintained by a taping 38 provided to protect the electrical cables, this prevents the charged resin material 37 from being fitted with the bending of the electrical cables 32, which in turn encourages cracks c to develop at the interfaces between the electrical cables and the resin material and in the resin material itself. As a result, the cracks c damage the sealability of the case main body.

SUMMARY OF THE INVENTION

The invention has been made in consideration of the aforementioned circumstances and its object resides in preventing the deterioration of the sealability of the charged resin material by reducing the sharp bending of the electrical cables with the aid of the rear holder.

To achieve the above object, the invention is applied to an electrical cable holding case that comprises: a cylindrical case main body and a lid-like rear holder having an electrical cable insertion hole and a resin charging hole. The electrical cable holding case is characterized in that an electrical cable taken out of the case main body via the electrical insertion hole of the rear holder is held so as to be watertight by embedding the electrical cable from inside the case main body to the outer surface of the rear holder by resin molding, and that an electrical cable support wall is arranged at an edge of the electrical insertion hole outside the rear holder.

In addition, the electrical cable support walls are arranged continuously over a plurality of electrical insertion holes, and resin flowing grooves are formed on the electrical cable support walls.

The electrical cable support walls block sharp bending of electrical cables taken out of the rear holder. The resin flowing grooves improve fluidity of the resin at the time of resin molding, thereby ensuring a reliable resin charging operation.

DETAILED DESCRIPTION OF PREFERRED EMBODIMENTS

Figure 1:
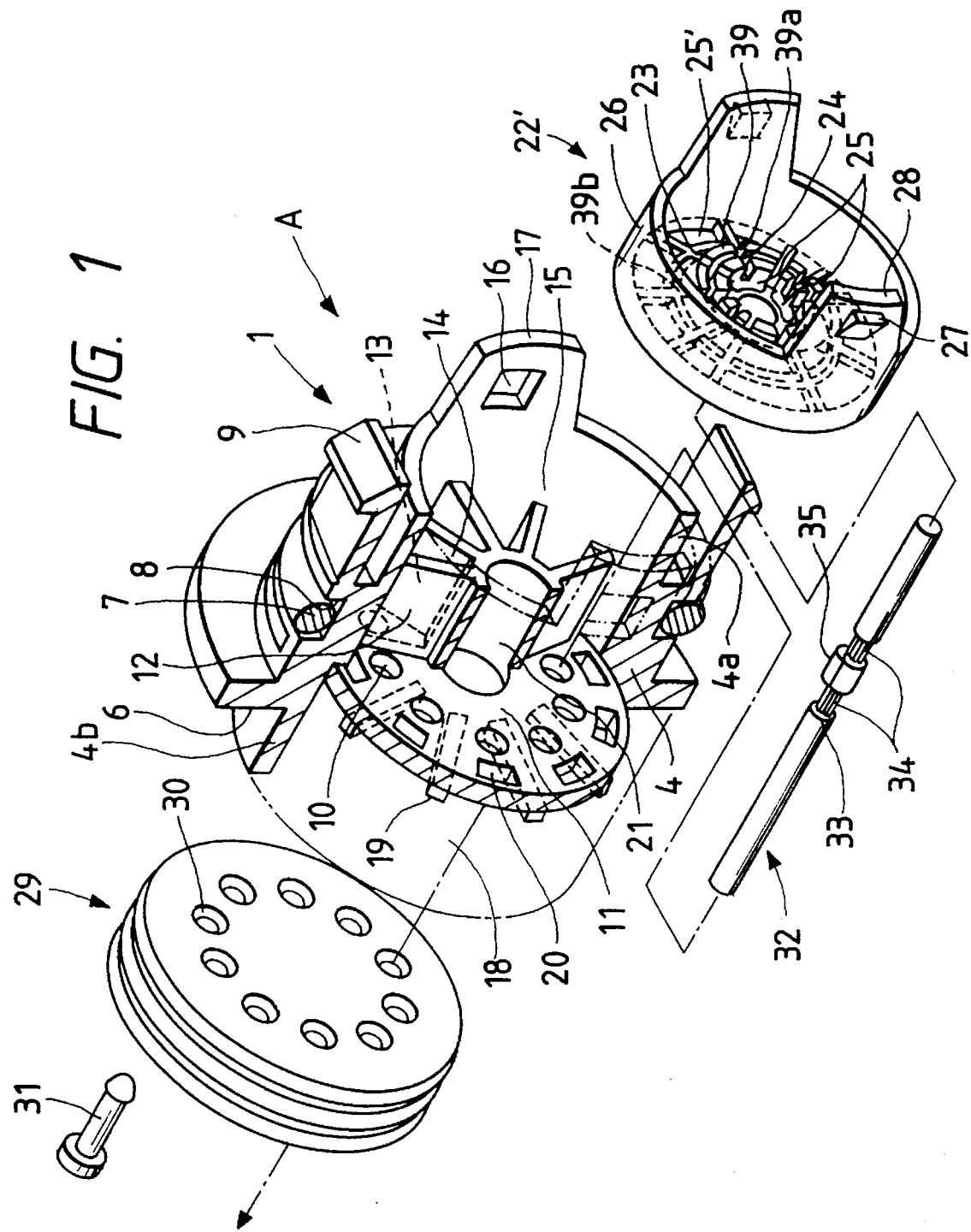
FIG. 1 is a perspective view of a rear holder portion of an oil leakage preventing electrical cable holding case, which is an embodiment of the invention.
Figure 2:
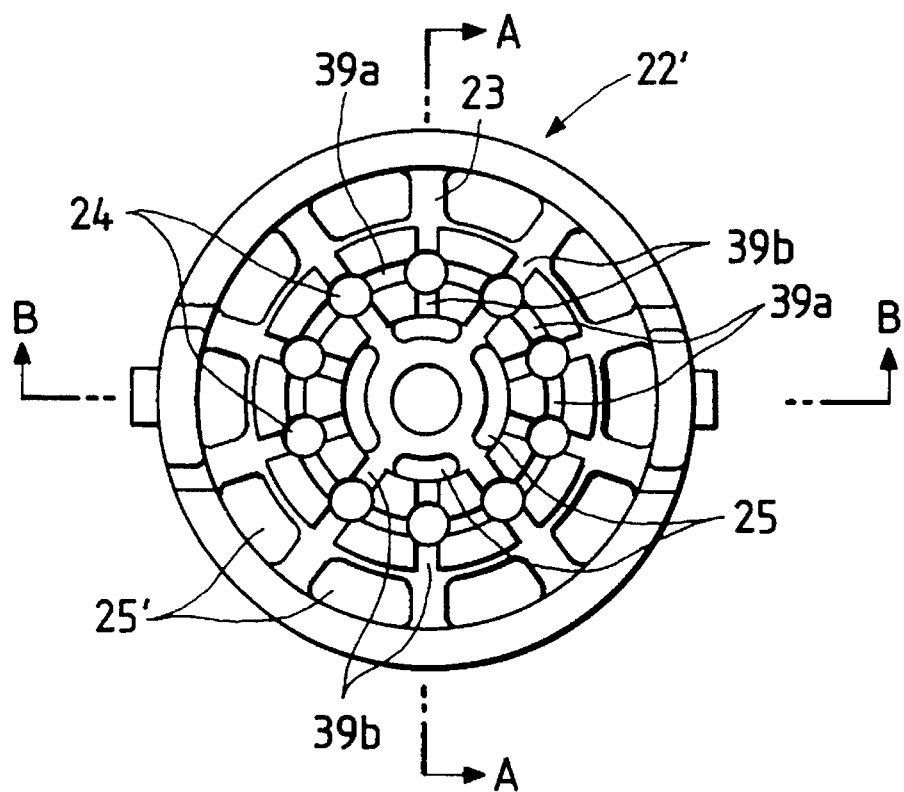
FIG. 2 is a front view of FIG. 1.
Figure 3:
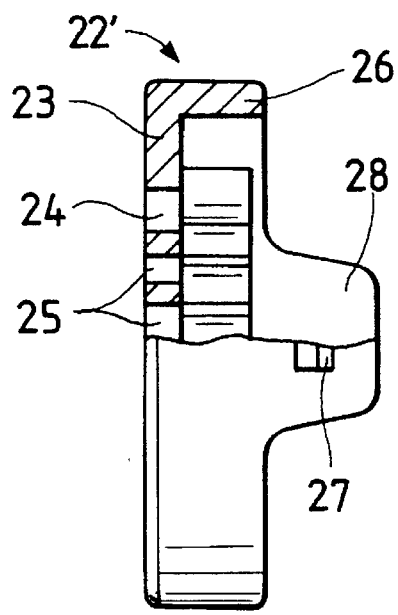
FIG. 3 is a sectional view taken along a line A—A of FIG. 2.
Figure 4:
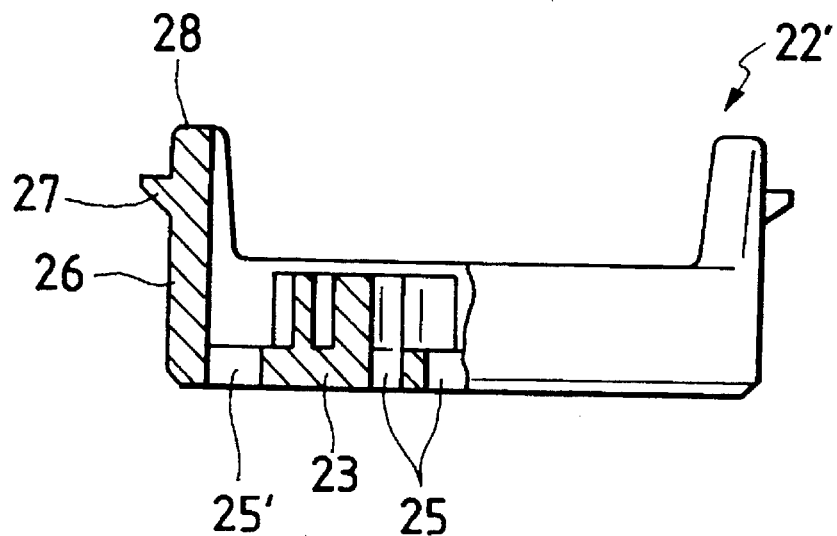
FIG. 4 is a sectional view taken along a line B—B of FIG. 2.
Figure 6:
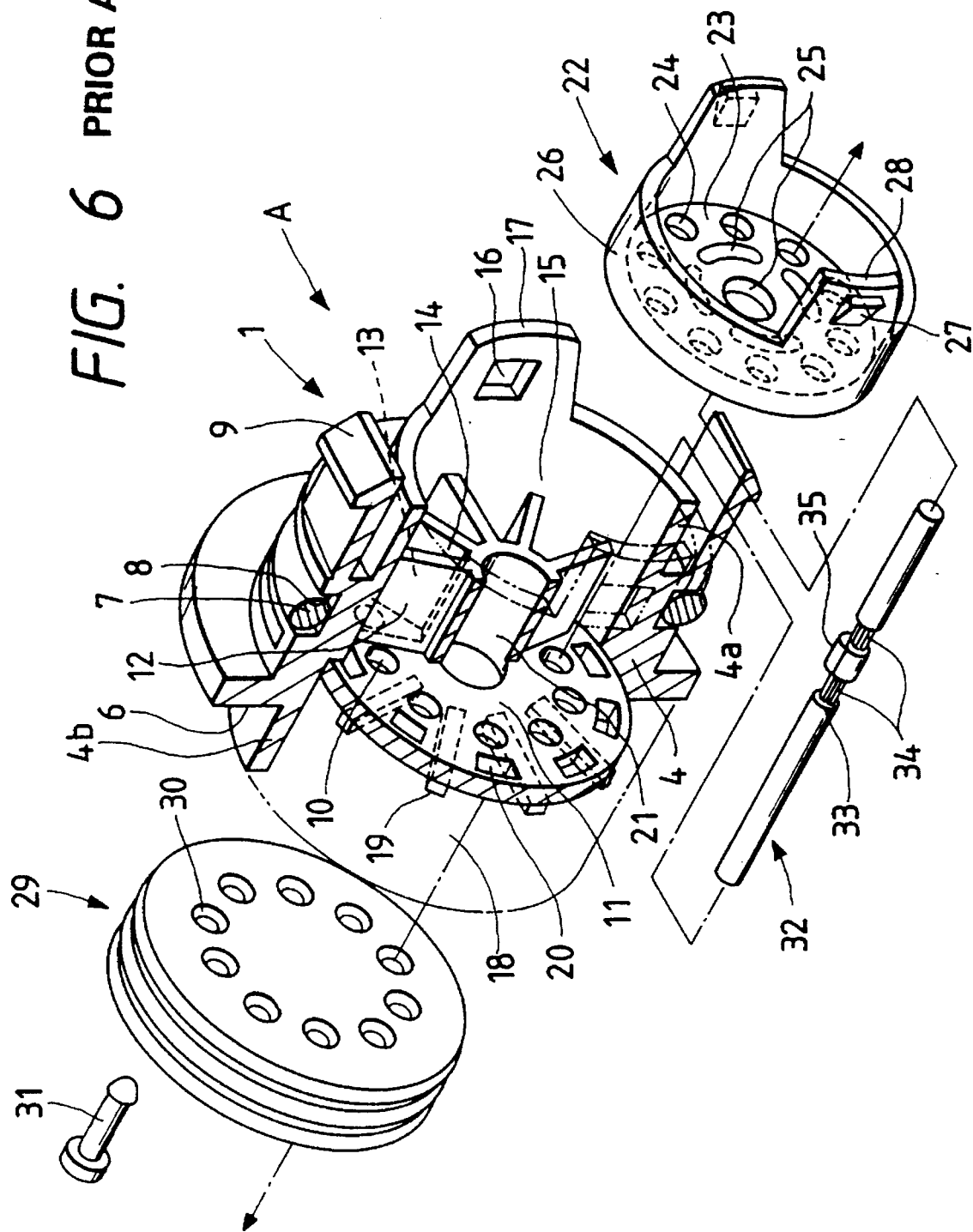
FIG. 6 is an exploded perspective view of a conventional example.
Figure 7:
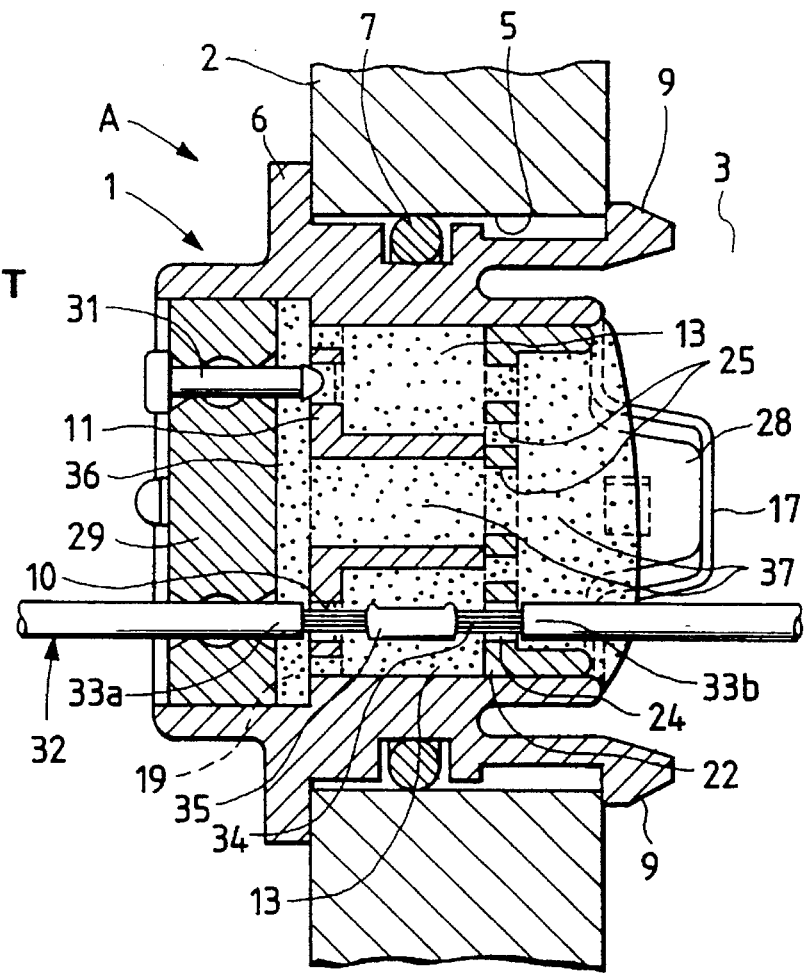
FIG. 7 is an exploded perspective view showing an assembled state of FIG. 6.
Figure 8:
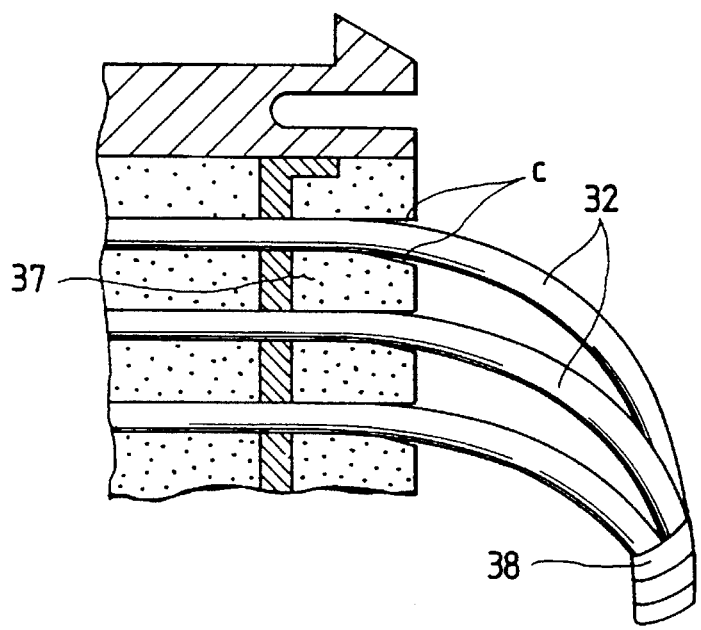
FIG. 8 is a diagram showing a main portion of the conventional example in use.

In FIG. 1, the construction of an embodiment of the invention is the same as that of the conventional example shown in FIG. 6 except for a rear holder 22'. Therefore, the parts and components of the embodiment will be denoted by the same reference numerals.

In the rear holder 22', not only are a plurality of electrical cable insertion holes 24 formed in a circular bottom wall 23, but also resin charging holes 25, 25' are arranged on the inside and outside of the electrical cable insertion holes, and retaining pieces 28 having retaining projections 27 on an end of a circumferential wall that is continuous from the bottom wall 23 are projected.

In the bottom wall 23, electrical cable support walls 39 facing the interior of the oil cover are erected outside the edges of the electrical insertion holes 24. An annular resin flowing groove 39a is formed on the circumference of the electrical support walls 39 so as to connect the respective electrical cable insertion holes 24. In addition, radially extending resin flowing grooves 39b are formed on the electrical cable support walls 39 so as to traverse the respective electrical cable insertion holes 24 in the radial direction.

Figure 5:
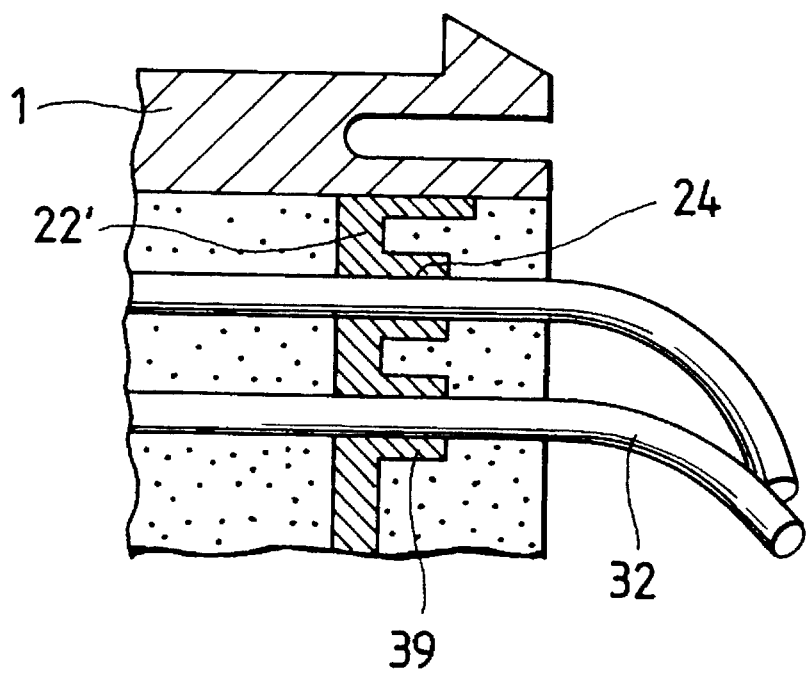
FIG. 5 is a sectional view of a main portion of the electrical cable holding case in use.

FIG. 5 shows how the electrical cable holding case is used. The electrical cable support walls 39 prevent sharp bending of the electrical cables 32 at the resin charging portions when the electrical cables 32 exiting the electrical cable insertion holes 24 are bent downward with the rear holder 22' attached to a case main body 1, so that cracking of resin portions will be prevented. As a result, the resin flowing grooves 39a and 39b act so as to eliminate the electrical support walls 39 disturbing the fluidity of the resin at the time of charging the resin.

The first aspect of the invention is characterized as allowing the electrical support walls to prevent sharp bending of the electrical cables at the resin charging portions to thereby prevent cracking of the charged resin for sealing.

The second aspect of the invention is characterized as allowing the electrical flowing grooves to eliminate the electrical support walls disturbing the fluidity of the resin being charged to thereby ensure reliable charging of the resin.

What is claimed is:

1. An electrical cable holding case for holding one or more electrical cables, said case comprising:

a cylindrical case main body, having a recess at one end; and a lid-like rear holder disposed in said recess, having one or more electrical cable insertion holes and at least one resin injecting hole through which a resin is injected, said rear holder having an inner surface and an outer surface, said outer surface facing out when said rear holder is disposed in said main body, wherein one or more rigid electrical cable support walls are provided on said outer surface of said rear holder at edges of said one or more electrical cable insertion holes for preventing sharp bending of the electrical cables at resin charging portions to thereby prevent cracking of the resin.

2. An electrical cable holding case according to claim 1, wherein resin flowing grooves are formed in said one or more electrical cable support walls.

3. An electrical cable holding case according to claim 2, wherein said one or more electrical cable insertion holes are disposed radially equidistant from a center of said rear holder, and wherein said resin flowing grooves are disposed in radial and circumferential directions.

4. An electrical cable holding case according to claim 2, wherein said resin flowing grooves open into said one or more cable insertion holes.

5. An electrical cable holding case according to claim 4, wherein said resin flowing grooves are spaced around said one or more cable insertion holes.

6. An electrical cable holding case according to claim 4, wherein the resin flowing grooves are equally spaced around said one or more cable insertion holes.

7. An electrical claim holding case according to claim 1, wherein said one or more support walls respectively contact said one or more cables.

* * * * *